United States Patent [19]
Nakashima

[11] Patent Number: 6,029,211
[45] Date of Patent: Feb. 22, 2000

[54] PC CARD CAPABLE MULTIPLE FUNCTIONS AND CORRESPONDING CARD INFORMATION STRUCTURES (CIS) WHERE SWITCH SETTING ELEMENT SELECTS CIS TO READ OUT BASED ON SELECTION SIGNAL

[75] Inventor: Tatsuya Nakashima, Yokosuka, Japan

[73] Assignee: Murata Manufacturing Co., Ltd., Japan

[21] Appl. No.: 08/984,433

[22] Filed: Dec. 3, 1997

[30] Foreign Application Priority Data

Dec. 4, 1996 [JP] Japan ..................................... 8-339017

[51] Int. Cl.[7] ..................................................... G06F 9/06
[52] U.S. Cl. .......................... 710/14; 365/185.33; 710/8; 710/102; 710/131
[58] Field of Search ........................ 365/185.33; 710/44, 710/102, 113, 129, 8, 14, 131

[56] References Cited

U.S. PATENT DOCUMENTS

| | | | |
|---|---|---|---|
| 5,329,491 | 7/1994 | Brown et al. ...................... | 365/185.33 |
| 5,572,683 | 11/1996 | Epolite et al. ........................... | 395/284 |
| 5,613,092 | 3/1997 | Lim et al. ................................ | 395/503 |
| 5,664,231 | 9/1997 | Postman et al. ........................ | 395/893 |
| 5,671,374 | 9/1997 | Postman et al. ........................ | 395/389 |
| 5,778,195 | 7/1998 | Gochi ...................................... | 710/102 |
| 5,784,291 | 7/1998 | Chen et al. ............................. | 364/491 |
| 5,784,633 | 7/1998 | Petty ....................................... | 395/888 |
| 5,797,031 | 8/1998 | Shapiro et al. ......................... | 395/828 |
| 5,805,929 | 9/1998 | Connolly et al. ......................... | 710/49 |

Primary Examiner—Thomas C. Lee
Assistant Examiner—Chien Yuan
Attorney, Agent, or Firm—Ostrolenk, Faber, Gerb & Soffen, LLP

[57] ABSTRACT

A plurality of CIS1 through CISM are installed in memory of a PC card. Each CIS is provided with basic attribute information and functional attribute information, which are mutually independent, A selection signal for the CIS to be used is input from selection signal input means. A selection signal discriminator determines the CIS selected by means of the signal input from the selection signal input means. A CIS switch setting element sets the designated CIS as the CIS to be read in by a personal computer, and causes the CIS that has been set to be read in by the personal computer.

12 Claims, 5 Drawing Sheets

PC CARD CAPABLE MULTIPLE FUNCTIONS AND CORRESPONDING CARD INFORMATION STRUCTURES (CIS) WHERE SWITCH SETTING ELEMENT SELECTS CIS TO READ OUT BASED ON SELECTION SIGNAL

BACKGROUND OF THE INVENTION

1. Field of the Invention

The present invention relates in general to a PC card, and more specifically to a multifunction-type PC card having a plurality of card information structures, or CISs, which constitute the functional attribute information of the PC card, and a CIS switching mechanism.

2. Description of the Related Art

Generally speaking a PC card contains circuitry for realizing its functions and a storage area for the CIS, which provides the functional attribute information of the card. Here the term "functions" is intended to refer to local area network (LAN) access, modem, memory, PHS, PDC, terminal adapter (TA), FM tuner, AM tuner, TV tuner, and the like.

FIG. 8A is a drawing showing the structure of a single-function PC card. The logic for realizing single function 1 and a single CIS corresponding to that function are contained within the PC card. When using this type of PC card, the user is required to change the PC card inserted into the PC card slot of a personal computer or the like in accordance with the purpose.

Alternatively, to avoid the inconvenience of changing PC cards, PC cards may be manufactured incorporating logic for the realization of a plurality of functions, as is shown in FIG. 8B. In this case the CIS contains functional attribute information corresponding to function 1 and function 2 respectively. When using this type of PC card, the PC must be provided with a card driver having multifunction capability, by means of which the two sets of functional attribute information resident in CIS1 are read into the personal computer memory, allowing the personal computer to recognize the two functions.

CISs are defined by rules conforming to PC card standards established by PCMCIA in the United States and by JEIDA in Japan, under which the CIS of a PC card is stored starting from the leading address of the CIS storage memory area. Further, the end of the CIS is indicated by a predetermined delimiter.

When a multifunction-type PC card is inserted into the slot of a personal computer that does not have installed therein a driver with multifunction capability, the personal computer, in accordance with the above-cited standards, reads the CIS from the leading address of the CIS storage area up to the delimiter into the personal computer memory. The CIS corresponding to function 2, which is stored after the CIS corresponding to function 1, is not transferred to the personal computer memory. As a result, even though a multifunction-type PC card is inserted into the personal computer, the computer recognizes it as a single-function PC card having function 1.

When, on the other hand, a multifunction-type PC card is inserted into the PC card slot of a personal computer in which a driver with multifunction capability is installed, the computer reads in the plurality of CISs and activates the corresponding functions. That is to say, all the functions resident in the PC card inserted in the slot are activated, irrespective of whether they are actually used or not. This results in unnecessary consumption of power. Reducing power consumption is of particular importance in the case of battery-operated information equipment.

Let us consider an example of a PC card 1 having two functions: a modem and an ATA memory. The modem draws a current of approximately 120 mA and the ATA memory draws approximately 1 mA in standby mode. In common types of cards, the frequency of use of the ATA memory is higher than that of the modem. It is sufficient if the modem is activated only during the exchange of data with external systems. Nevertheless the PC card draws 121 mA of current at all times.

CIS switching mechanisms are also described in co-pending U.S. patent application Ser. Nos. 08/984,232 and 08/984,597, filed on even date herewith.

SUMMARY OF THE INVENTION

Accordingly it is an object of the present invention to provide a PC card that enables a personal computer to utilize all the functions resident in a multifunction-type PC card without the installation of a driver having multifunction capability, and that yet conforms to the specifications established by industry standards.

It is a further object of the present invention to provide a multifunction-type PC card in which only the desired function(s) is/are selectively activated, and power consumption is reduced.

The foregoing objects are achieved in one aspect of the present invention through the provision of a PC card provided with a plurality of functions, and a plurality of card information structures (CISs), including functional attribute information for a single one of or for a combination of the functions, together with basic attribute information, which constitutes the basic attribute information for the card, plurally installed at an address that differs for each CIS, the PC card including: selection signal input means for inputting a CIS selection signal to the PC card; and a CIS switch setting element for discriminating the selection signal to be input by the selection signal input means, to which data on addresses of each CIS has been previously supplied, and, on the basis of the address, switchably setting the selected CIS as the CIS to be read into a personal computer.

The foregoing objects are achieved in another aspect of the present invention through the provision of a PC card provided with a plurality of functions, and a plurality of card information structures (CISs), including functional attribute information for a single one of or for a combination of the functions, together with basic attribute information, which constitutes the basic attribute information for the card, plurally installed, the PC card including: selection signal input means for inputting a CIS selection signal to the PC card; a CIS switch to switchably connect the read-in signal line of a personal computer to the read-out signal line of each CIS; and a CIS switch setting element for discriminating the selection signal to be input by the selection signal input means, and for controlling the operation of the CIS switch so as to switchably connect the read-out signal line of the selected CIS to the read- in signal line of the personal computer.

The foregoing objects are achieved in still another aspect of the present invention through the provision of a PC card provided with a plurality of functions, and a plurality of card information structures (CISs), including functional attribute information for a single one of or for a combination of the functions, together with basic attribute information, which constitutes the basic attribute information for the card, plurally installed, the PC card including: selection signal input means for inputting a CIS selection signal to the PC card; a CIS read-in memory that stores the CIS to be read into a personal computer; and a CIS switch setting element for discriminating the selection signal to be input by the selection signal input means, and for transferring to and storing in the CIS read-in memory the data of the selected CIS.

The PC card may be configured such that the selection signal input means is provided by a switch installed in the PC card, and the turning on and off of the signal of the switch acts as the CIS selection signal.

The PC card may be configured such that the selection signal input means is provided by a connector section provided on the PC card, and the connect signal and non-connect signal of a connector connected to the connector section act as the CIS selection signal.

The PC card may be configured such that the selection signal input means is provided by personal computer software having a program that outputs the CIS selection signal.

The present invention is so configured that a plurality of functions are installed in a PC card, the CIS for a single one of or a combination of these functions is provided with basic attribute information and functional attribute information, each of the CISs is plurally installed in an independent manner, the CIS to be selectively used from among that plurality of CISs is selectively designated by a selection signal input means, and by means of the selection signal, the CIS to be read in by the personal computer is switchably set as the designated CIS, with the effect that, when the personal computer is provided with a driver having multifunction capability, selectively designating a plural-function CIS makes possible the use of a plurality of functions, while selectively designating a single-function CIS enables the activation of only that single function.

And moreover, since each of the CISs installed in the PC card is independently configured with basic attribute information and functional attribute information, so that the personal computer can read in only the data for the selectively designated CIS and establish the operating environment of that CIS, and need not establish the operating environment for other CISs that were not selected, with the effect that extra or excess power consumption is avoided and the more energy-efficient use of the PC card is realized.

Further, even in a case in which the personal computer is not provided with a driver having multifunction capability, it is possible to selectively designate a single-function CIS using the selection signal input means, and thereby, from among the plurality of CISs installed in the PC card, to switchably set only the single-function CIS that has been selectively designated as the CIS to be read in by personal computer 3, so that personal computer 3 can read in the selectively designated CIS and carry out the functional operations corresponding to that CIS, thereby providing for greater convenience in use.

Further, since the plurality of CISs installed in the PC card can be installed in read-only memory (ROM) and read therefrom, with the result that the required number of CISs can be installed in the PC card for selective use without increasing the scale of the circuitry. Further, a plurality of CISs are installed using a ROM or other memory, with the result that, even when the PC card is not provided with a CPU (computer circuitry) or other controller circuitry, the circuitry embodying the present invention is simplified to the minimal circuitry necessary.

Further, in an invention so configured that the selectively designated CIS(s) are transferred to and read into the CIS read-in memory, and the CIS information stored in the CIS read-in memory is read into the personal computer, it is possible to provide the circuitry for the transfer of these selectively designated CISs to the CIS read-in memory together with the CIS read-in memory, in the CIS interface circuitry of the PC card, and, by means of such a configuration, to accomplish the circuit structure of the present invention in the same space as a conventional PC card with only minor changes in firmware, thereby making it easy to install the advanced structure of the present invention in a PC card, and attaining great practical benefit.

Further, when the selection signal input means is provided by a switch, the person using the PC card can selectively designate the CIS(s) in accordance with the function(s) to be used, so that, in addition to significantly improved convenience of use, it is possible to ascertain the position of the switch by external observation, with the effect that it is possible easily to determine which CIS functional operations from among a plurality of PC card CISs is being carried out by the personal computer.

Further, when the selection signal input means is provided by a connector section, it is possible to arrange a configuration such that when, for example, a communications connector is connected to the connector section, the CIS of a modem is automatically selectively designated, and when the communications connector is disconnected from the connector section, the CIS for a function other than the modem, such as an ATA memory, is automatically selectively designated, thereby significantly improving convenience of use.

Further, when the selection signal input means is provided by software on the personal computer, having a program that outputs the CIS selection signal, switches and other elements for selectively designating the CIS are unnecessary, thereby obviating the inconvenience of attaching switches or other elements to the PC card, with the effect that the cost of the PC card can be reduced.

DETAILED DESCRIPTION OF THE PREFERRED EMBODIMENTS

Figure 1:
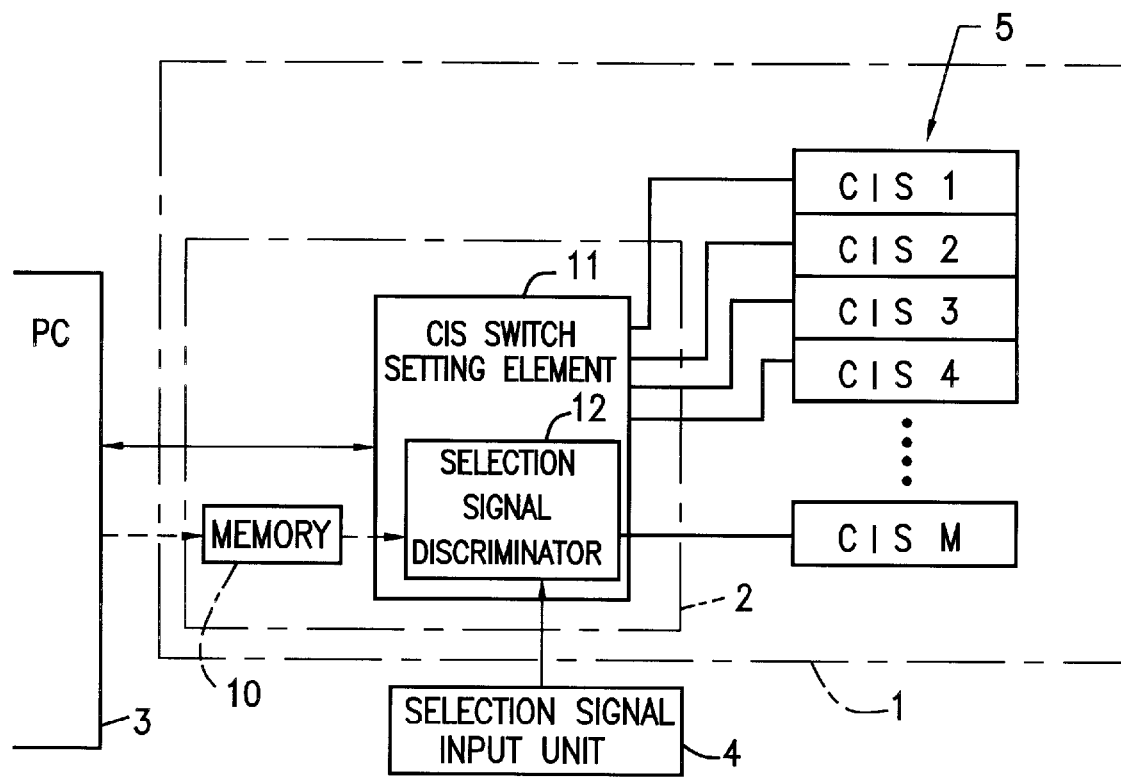
FIG. 1 is an explanatory drawing of the main elements of a first embodiment of the present invention.

According to the present invention, a PC card is loaded with a plurality of functions, together with a plurality of CISs (card attribute information), being either CISs in which the basic attribute information of the card and functional attribute information for single functions are combined, or CISs in which basic attribute information and functional attribute information for a plurality of functions are combined, or both, and PC card is inserted into the slot of a personal computer. A signal for selecting the CIS of the function to be used from among the plurality of functions is then input from the selection signal input means to the PC card.

A CIS switch setting element discriminates the selection signal that is input by the selection signal input means, determines which CIS of the plurality of CISs resident in the PC card is to be used, and switchably sets the CIS to be used as the CIS to be read into personal computer memory. That is to say, the CIS switch setting element switchably sets the selected CIS as the CIS to be read in by the personal computer on the basis of the address assigned to the CIS.

The selected CIS may be switched by controlling the CIS switch in such a way that the read-in signal line of the personal computer is connected to the read-out signal line of the selected CIS.

The CIS may also be switched by transferring (copying) the data of the selected CIS to a CIS read-in memory. The personal computer then reads in the information of the CIS set by the CIS switch setting element, thereby establishing an environment for the energization of the circuitry of only the function to be used, and efficiently carrying out operations for the function related to the selected CIS.

Following is a description of an embodiment of the present invention based on the drawings. In FIG. 2 there is shown a structure of an embodiment in accordance with the fundamental principle of the present invention, and in FIG. 1 there is shown the detailed structure of a CIS switching mechanism provided in controller 2 of FIG. 2.

In the drawings there is shown a PC card 1, wherein are installed a plurality of functions, namely function 1 through function N (N being an integer greater than 1), and wherein are installed CISs which constitute attribute information for each of these functions, either singly or in combination, namely CIS1 through CISM (M being an integer greater than 1). PC card 1 is additionally provided with a controller 2 for switchably setting the CIS for the function to be used as the CIS to be read into personal computer 3. The selection signal for selectively designating the CIS to be used is applied to this controller 2 from selection signal input means 4.

Figure 2:
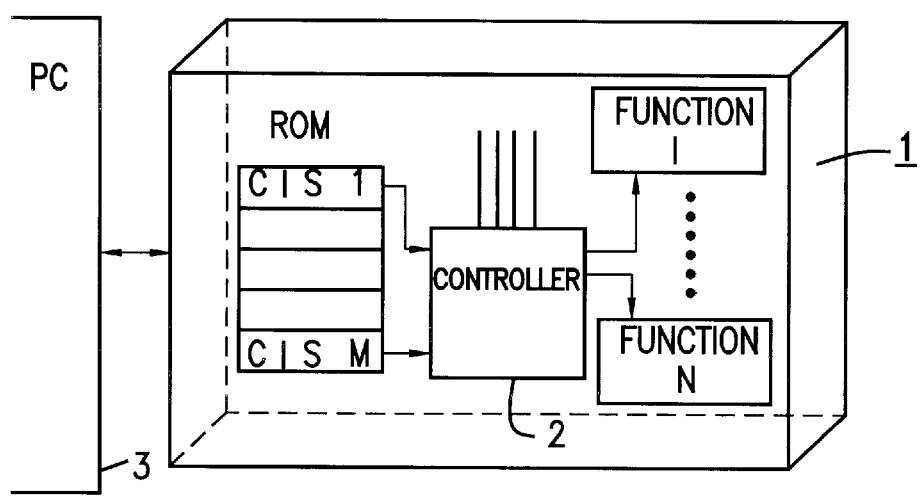
FIG. 2 is a structural drawing according to the fundamental principle of the present invention.

As is shown in FIG. 1, there is installed in PC card 1 a CIS configured according to rules conforming to card standardization protocols established by PCMCIA in the United States and by JEIDA in Japan.

Figure 3:
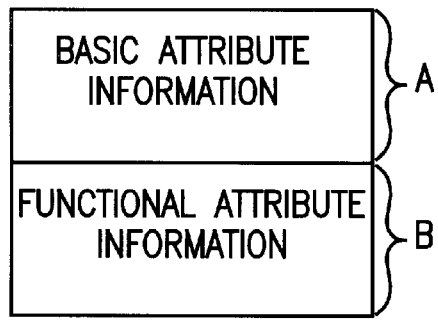
FIG. 3 is an explanatory drawing in which there is shown the installation configuration of CIS information in an embodiment of the present invention.

That is to say, as shown in FIG. 3, a single CIS comprises basic attribute information, which is the basic attribute information of PC card 1, and functional attribute information, and in the A region at the head of the CIS data installation area are installed the basic attribute information concerning the type of the card that is to be used, the function for which the attribute information is stored next, the nature of the data array structure, and the like. Next, in the B area, is installed the attribute information of the function to be used. For example, in the case of the single function of ATA memory, the functional attribute information of the ATA memory is installed, and for a combination of the two functions of modem and ATA memory, the respective functional attribute information of the modem and ATA memory are installed. In this way PC card 1 is provided with a plurality of CISs including basic attribute information and functional attribute information. Further, in the first embodiment, each CIS is installed with a different address assigned.

Controller 2 is provided with a CIS switch setting element 11, which has a selection signal discriminator 12.

Selection signal discriminator 12 reads in a selection signal applied from selection signal input means 4, and from that selection signal determines the CIS that has been selectively designated. In the case shown in FIG. 1, for example, selection signal input means 4 determines which of a number M of CISS, namely CIS1 through CISM, has been selectively designated.

CIS switch setting element 11 is previously provided with data on the addresses assigned to each of the CISs, and CIS switch setting element 11, based on the result of a determination by selection signal discriminator 12, switchably sets by means of the address the CIS selectively designated by the selection signal as the CIS to be read into personal computer 3. When, for example, CIS3 is selectively designated by the selection signal, the address of CIS3 is detected and the CIS installed in the installation area at that address is selectively designated as the CIS to be read in by personal computer 3.

By means of the switchable setting of CIS switch setting element 11, personal computer 3 begins to read in, starting from the basic attribute information of the selectively designated CIS. When that information has been completely read, personal computer 3 proceeds to functional attribute information that follows, and reads the data that indicates the completion of that functional attribute information, thereby completing read-in of the data for the selectively designated CIS.

With the read-in of the data for this selectively designated CIS, personal computer 3 establishes an environment that enables utilization of the function related to that CIS.

Thus in accordance with this embodiment of the present invention, since a plurality of CISs are installed in PC card 1, and each CIS has basic attribute information and functional attribute information, each CIS takes the configuration of a CIS in one single-type or multi-type PC card according to prior art. Thus the card attribute information (CIS) for a plurality of single-type or multi-type PC cards can be provided for each CIS independently on a single PC card 1. Accordingly by assigning a CIS having basic attribute information and functional attribute information to a PC card 1 according to this embodiment of the present invention, it is possible, using PC card 1 according to the present invention, to selectively carry out the operations of a single function, even if personal computer 3 is not provided with a driver having multifunction capability.

When, on the other hand, personal computer 3 is provided with a driver having multifunction capability, it is possible to selectively designate not only, obviously, a single-function CIS, but also a multiple-function CIS. Thus it is possible to selectively carry out the operations of those multiple functions in the same way as when using a multi-type PC card according to prior art. In that case, in accordance with the present invention, each of the CISs is of mutually independent configuration, so that when, for example, CIS3 is selectively designated, personal computer 3 need only establish an operating environment for the function relating to CIS3, and need not establish an operating environment for the functions of the other CISs, thereby making possible a concomitant reduction in current drain.

Moreover, since as above described each of the CISs has basic attribute information and functional attribute information and is mutually independent, the basic attribute information for each CIS can be structured as appropriate for the function, with the effect that each CIS can be designed with the optimal data structure.

Figure 4:
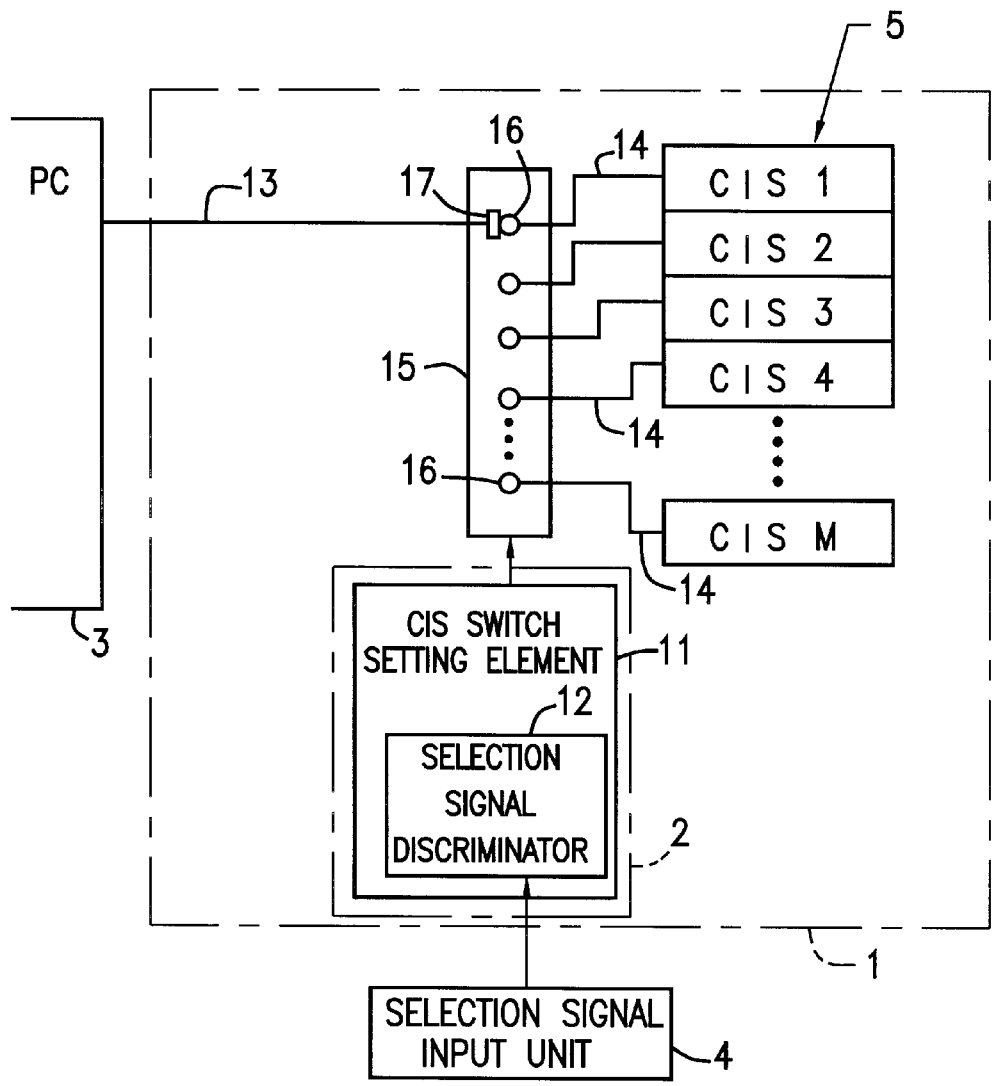
FIG. 4 is an explanatory drawing of the main elements of a second embodiment of the present invention.

FIG. 4 is an explanatory drawing in which are shown the main elements of a second embodiment of the present invention. In the description of this second embodiment, the elements that are identical with those in the first embodiment above described are assigned the identical symbols, and reduplicative explanation is omitted.

The characteristic structure that differentiates this second embodiment from the first embodiment above described is that it is provided with a CIS switch 15 that switchably connects read-in signal line 13 of personal computer 3 to any one of CIS read-out signal lines 14, and the switchable setting of the CIS is realized by controlling the switching of CIS switch 15 by means of CIS switch setting element 11; all other structures being similar to those of the first embodiment.

To the fixed contact points 16 of CIS switch 15 are connected the corresponding CIS read-out signal lines 14, and to movable contact point 17 is connected read-in signal line 13 of personal computer 3. CIS switch setting element 11 controls the switching of CIS switch 15 in such a way that fixed contact point 16 of the CIS determined by selection signal discriminator 12 is connected to movable contact point 17 on the personal computer 3.

In addition to realizing effects similar to those of the first embodiment above described, this second embodiment effects CIS switching by means of CIS switch 15, with the effect that the circuit structure of controller 2 can be simplified.

Figure 5:
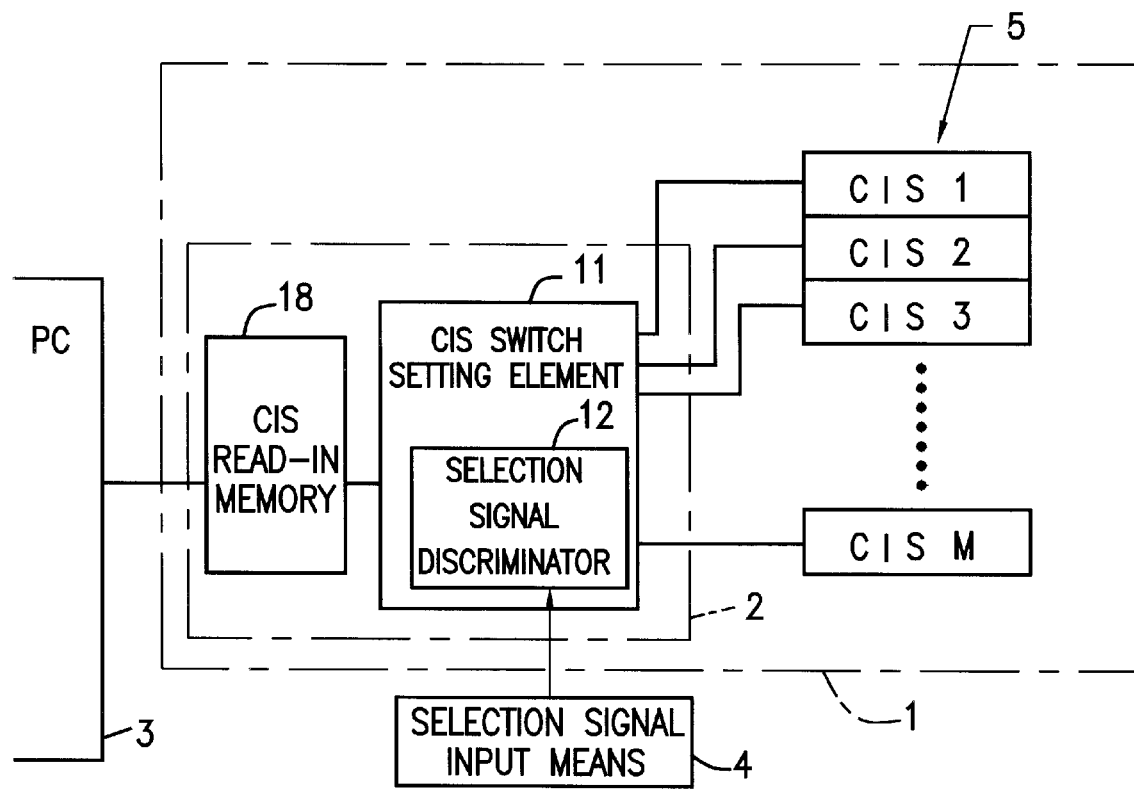
FIG. 5 is an explanatory drawing of the main elements of a third embodiment of the present invention.

FIG. 5 is an explanatory drawing in which are shown the main elements of a third embodiment of the present invention. In the description of this third embodiment, the elements that are identical with those in the first and second embodiments above described are assigned the identical symbols, and reduplicative explanation is omitted.

The characteristic structure that differentiates this third embodiment is that it is provided with a CIS read-in memory 18, and that the data of the selectively designated CIS is transferred and stored (copied) into CIS read-in memory, so that personal computer 3 reads the data stored in this CIS read-in memory thereby carrying out the operations of the function relating to that CIS; all other structures being similar to those of the first and second embodiments.

In this third embodiment, CIS switch setting element 11 transfers the data for the CIS determined by selection signal discriminator 12 to CIS read-in memory, thereby setting the selected CIS. When, for example, selection signal input means 4 selects CIS2, that selection is determined by selection signal discriminator 12, and CIS switch setting element 11 transfers and stores to CIS read-in memory 18 the data for CIS2 that is stored in memory 5, thereby setting the selectively designated CIS. Then, by reading the CIS data stored in CIS read-in memory, personal computer 3 establishes an operating environment for the CIS that was selectively designated, and carries out the operations for the functions relating to the selectively designated CIS.

According to this third embodiment, when PC card 1 is without CPU control circuitry, or when firmware modifications cannot be made, it is possible to realize this embodiment by adding controller 2 to the existing CIS interface circuitry, so that a PC card in accordance with this embodiment can be configured at a minimal increase in cost over a PC card according to prior art. Further, this third embodiment can realize the same effects as the first embodiment above described.

Figure 6:
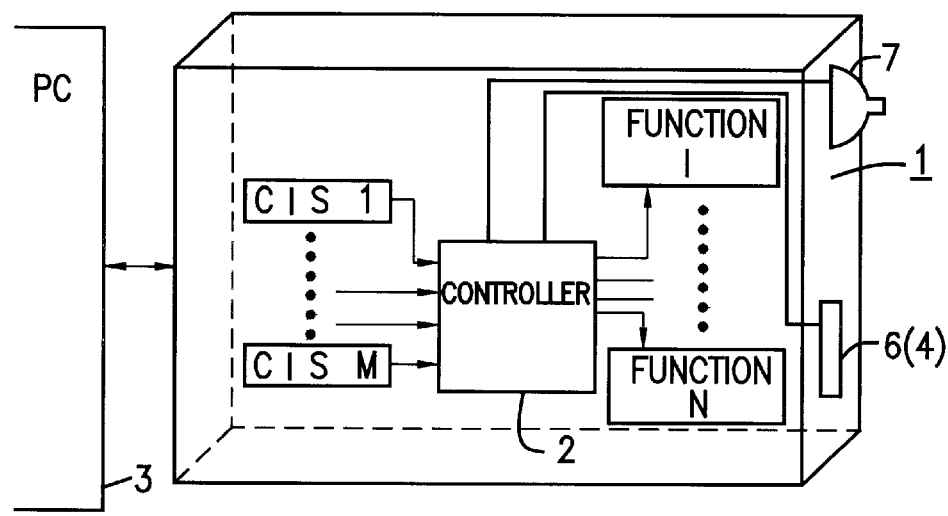
FIG. 6 is an embodiment of the present invention wherein the selection signal input means is provided by a switch 6 and a connector section 7.
Figure 7:
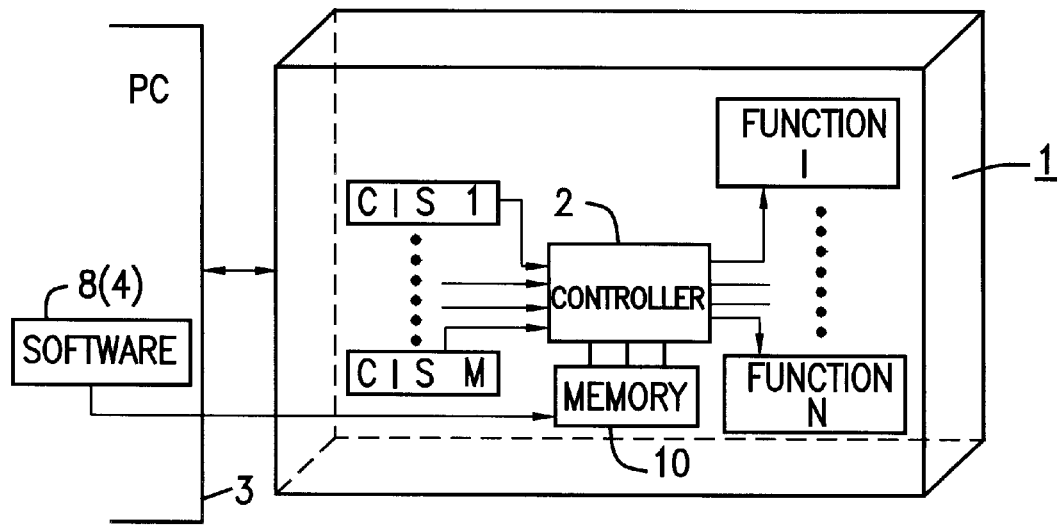
FIG. 7 is an explanatory drawing of an embodiment of the present invention wherein the selection signal input means is provided by software 15 of personal computer 3.
Figure 8A:
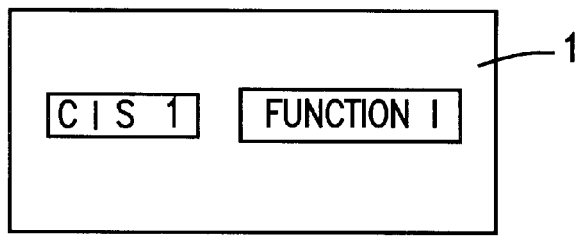
FIG. 8A is an explanatory drawing in which there is shown the function and the installation configuration of the CIS in a conventional single-type PC card.
Figure 8B:
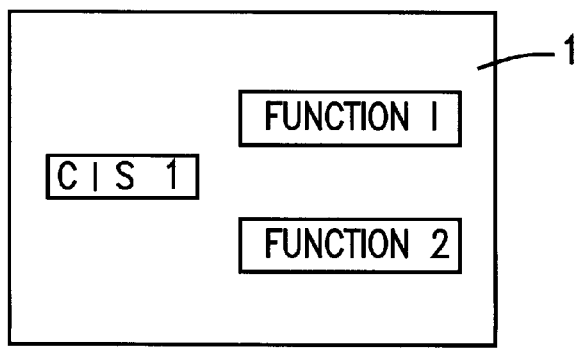
FIG. 8B is an explanatory drawing in which there is shown the functions and the installation configuration of the CIS in a conventional multi-type PC card.
Figure 9:
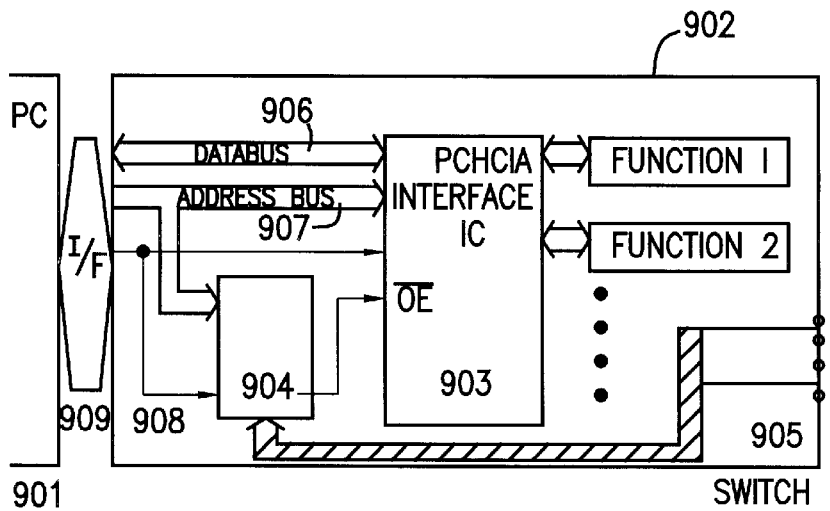
FIG. 9 is a block diagram showing a specific configuration of a PC card according to the present invention.
Figure 10:
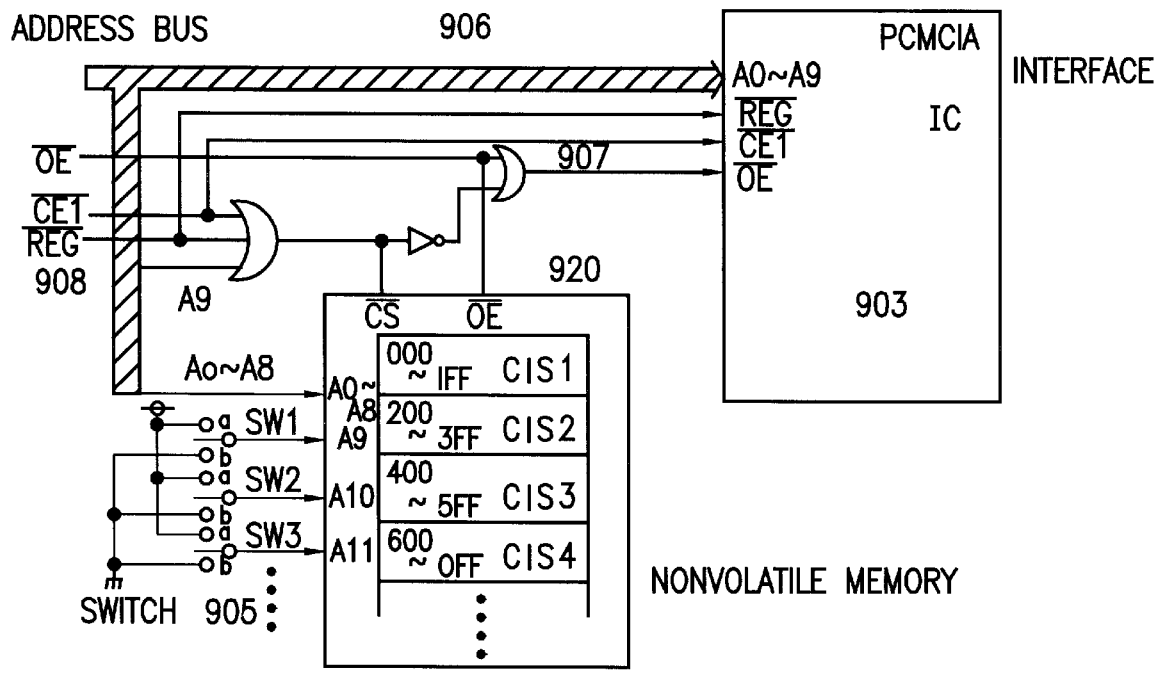
FIG. 10 is a more detailed representation of the block diagram of FIG. 9.

Let it be noted, however, that specific implementations of selection signal input means 4 in accordance with the embodiments above described can involve a variety of signal input structures, and specific examples of selection signal input means 4 are therefore shown in FIG. 6 and FIG. 7.

In the example in FIG. 6, PC card 1 is provided with a switch 6 and a connector section 7, either one or both of which may function as the selection signal input means.

When switch 6 serves as selection signal input means 4, the on signal of switch 6 may serve, for example, as the signal to selectively designate CIS2, in which are combined the modem and ATA memory functions, while the off signal of switch 6 may serve as the signal to selectively designate CIS1, for the single function of ATA memory.

By means of this structure, selection signal discriminator 12 determines that an on signal applied from switch 6 signifies that CIS2 is selectively designated, and that an off signal applied from switch 6 signifies that CIS1 is selectively designated. Then on the basis of the determination by selection signal discriminator 12, CIS switch setting element 11 switchably selects the CIS to be read in by personal computer 3. Thus by turning switch 6 on, use of the modem and ATA memory can be effected at the same time, and by turning switch 6 off, use of the ATA memory only can be effected. Note that the number of switches 6 to be provided corresponds to the number of CISs installed.

Again, when connector section 7 serves as the selection signal input means, a signal is applied to selection signal discriminator 12 which, when a connector for performing communication is connected to connector section 7, may be a connect signal serving to selectively designate CIS2, jointly for the modem and the ATA memory, and when the connector for performing communication is not connected to connector section 7, may be a non-connect signal serving to selectively designate CIS1, for the use of the ATA memory.

As a result, when, for example, a communications connector is connected to connector section 7, selection signal discriminator 12 determines that CIS2 has been selectively designated as the CIS to be read by personal computer 3, with the result that CIS switch setting element 11 switchably sets CIS2 as the CIS to be read in by personal computer 3.

Again, when the connector for performing communication is disconnected from connector section 7, the signal is interpreted by selection signal discriminator 12 as selectively designating CIS1 only, with the result that CIS switch setting element 11 selectively sets CIS1 as the CIS to be read in by personal computer 3 and the use of ATA memory only is effected. Note that the number of connector sections 7 to be provided corresponds to the number of CISs installed. Note further that when the selection signal input means is provided by connector section 7, PC card 1 need not be provided with switch 6.

In FIG. 7, there is shown an example in which selection signal input means 4 is provided by software 8 (having a program that outputs a switching signal) for personal computer 3. In the example of FIG. 7, there is provided in PC card 1 a memory 10 for storage of the switching signal output by software 8, as shown by broken lines in FIG. 1 and by solid lines in FIG. 7. The switching signal stored in memory 10 is read out by selection signal discriminator 12, and, in accordance with the switch signal, selection signal discriminator 12 determines which of the CISs has been selectively designated. Then, based on the determination by selection signal discriminator 12, CIS switch setting element 11 switchably sets the selectively designated CIS as the CIS to be read in by personal computer 3.

The CIS is selected on the basis of the status of the switch connected to the leading address in the non-volatile memory. The data is read out by the personal computer from the non-volatile memory at a timing such as to read the CIS access area addresses 000-1FF.

As for addresses of 200 and greater as seen from the personal computer, the register for setting functions is resident in the interface IC, with the result that read-out of the non-volatile memory is disabled.

What is claimed is:

1. A PC card, comprising:

a plurality of functions;

a plurality of card information structures (CISs) including functional attribute information for a single one of, or for a combination of, said functions and, basic attribute information for said card, each CIS being stored at a different address;

a selection signal input device which inputs a CIS selection signal into said PC card; and a CIS switch setting element having data corresponding with the respective addresses of each CIS, the CIS switch setting element selection one of said addresses as a function of the CIS selection signal and, on the basis of the address, switchably setting the selected CIS as the CIS to be read into a personal computer.

2. A PC card, comprising:

a plurality of functions;

a plurality of card information structures (CISs) including functional attribute information for a single one of, or for a combination of, said functions and, basic attribute information for said card, the CISs being plurally installed and connected to a respective read-out signal line;

a selection signal input device which inputs a CIS selection signal into said PC card;

a CIS switch to switchably connect a read-in signal line of a personal computer to one of the read-out signal lines of the CISs; and a CIS switch setting element which discriminates said CIS selection signal and controls said CIS switch so as to switchably connect the read-out signal line of a selected CIS to the read-in signal line of said personal computer.

3. A PC card, comprising:

a plurality of functions;

a plurality of card information structures (CISs) including functional attribute information for a single one of, or for a combination of, said functions and, basic attribute information for said card, the CISs being plurally installed a selection signal input device which inputs a CIS selection signal into said PC card;

a CIS read-in memory communicating with the installed CISs and storing the CIS to be read into a personal computer; and a CIS switch setting element which discriminates said CIS selection signal and causes data of the selected CIS to be stored in the CIS read-in memory for transfer into a personal computer.

4. A PC card as recited in claim 1, wherein said selection signal input device is a switch installed in said PC card, and the turning on and off of the signal of said switch acts as said CIS selection signal.

5. A PC card as recited in claim 1, wherein said selection signal input device is a connector section provided on said PC card, and the connect signal and non-connect signal of a connector connected to said connector section act as said CIS selection signal.

6. A PC card as recited in claim 1, wherein said selection signal input device includes personal computer software having a program that outputs said CIS selection signal.

7. A PC card as recited in claim 2, wherein said selection signal input device is a switch installed in said PC card, and the turning on and off of the signal of said switch acts as said CIS selection signal.

8. A PC card as recited in claim 3, wherein said selection signal input device is a switch installed in said PC card, and the turning on and off of the signal of said switch acts as said CIS selection signal.

9. A PC card as recited in claim 2, wherein said selection signal input device is a connector section provided on said PC card, and the connect signal and non-connect signal of a connector connected to said connector section act as said CIS selection signal.

10. A PC card as recited in claim 3, wherein said selection signal input device is a connector section provided on said PC card, and the connect signal and non-connect signal of a connector connected to said connector section act as said CIS selection signal.

11. A PC card as recited in claim 2, wherein said selection signal input device includes personal computer software having a program that outputs said CIS selection signal.

12. A PC card as recited in claim 3, wherein said selection signal input device includes personal computer software having a program that outputs said CIS selection signal.

* * * * *